Patented Mar. 2, 1926.

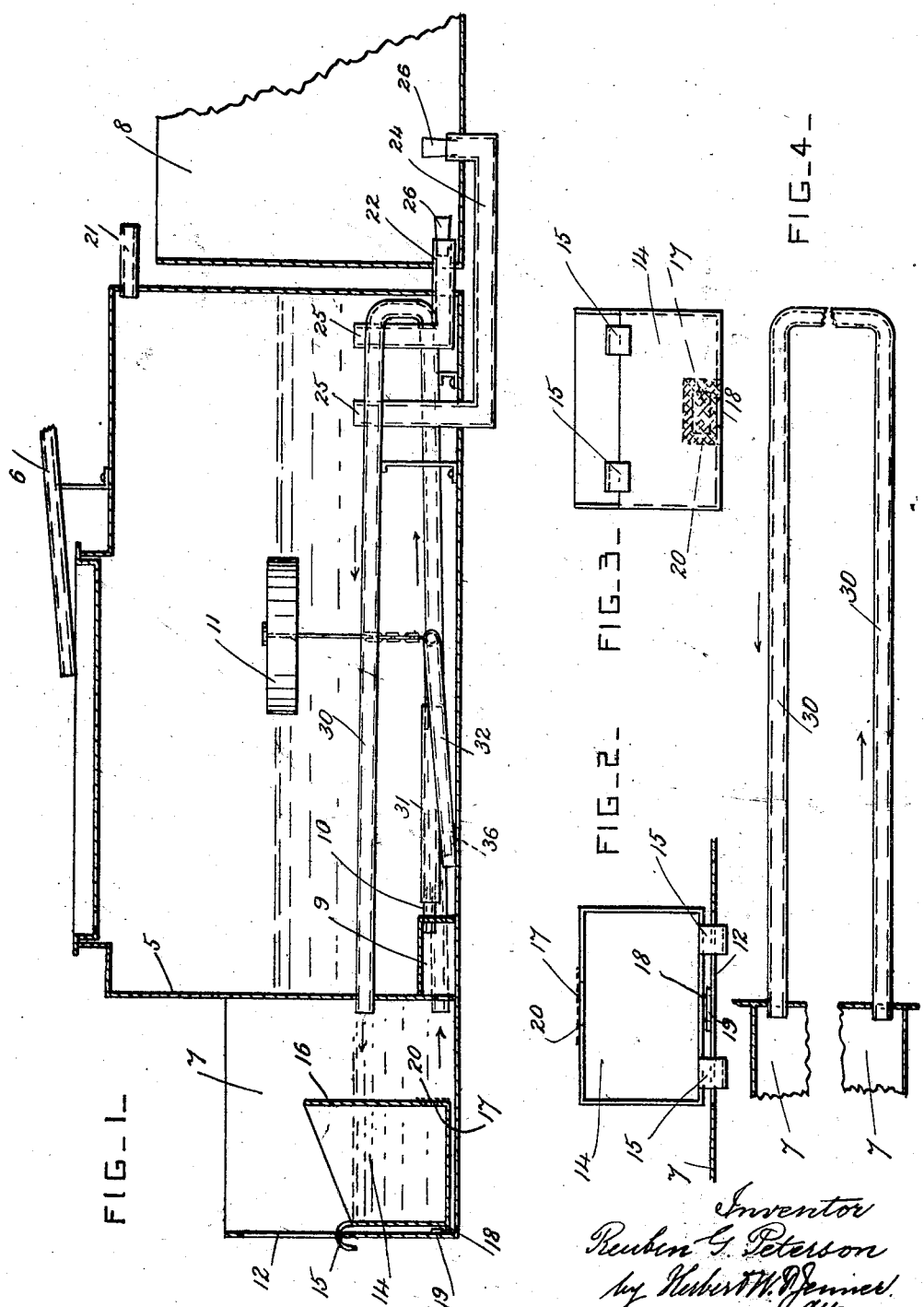

1,574,756

UNITED STATES PATENT OFFICE.

REUBEN G. PETERSON, OF WESSINGTON SPRINGS, SOUTH DAKOTA.

STOCK WATERER.

Application filed September 27, 1924. Serial No. 740,298.

*To all whom it may concern:*

Be it known that I, REUBEN G. PETERSON, a citizen of the United States, residing at Wessington Springs, in the county of Jerauld and State of South Dakota, have invented certain new and useful Improvements in Stock Waterers, of which the following is a specification.

This invention relates to tanks for supplying cattle and hogs with drinking water; and it consists in the novel construction and combination of the parts hereinafter fully described and claimed whereby an abundant supply of pure drinking water is at all times provided and whereby the hogs are prevented from fouling the water in the drinking trough.

In the drawings, Figure 1 is a vertical section through a stock waterer constructed according to this invention. Fig. 2 is a plan view of the removable receptacle for the water for the hogs, and a portion of the drinking trough. Fig. 3 is a front view of the removable receptacle. Fig. 4 is a plan view of the warming pipe for the drinking trough.

A closed supply tank 5 for the drinking water is provided, and is filled periodically from a pipe 6. The tank 5 is preferably a closed tank, and a drinking trough 7 is arranged at one side of it for constant use. Another tank 8 for cattle, open at the top, is also provided, and receives water from the supply tank independently of the drinking trough. The water is let into the drinking trough from an air vessel 9 to which inlet pipes 10 are connected, and the supply of water is regulated by a float 11. These regulating devices for the water are preferably those fully described in my patent No. 1,542,270, June 16, 1925, but any other approved means for regulating the supply of water to the drinking trough can be used that will control the level of the water in it.

A flexible hose pipe 31 is connected at its outlet end to the tubular stem 10 inside the tank, and an inlet nozzle 32 is connected to the inlet end of the hose pipe and has an inlet hole 36 of predetermined small size at its free end. The float 11 is connected to the nozzle at the inlet end portion of the flexible pipe. The float always holds the inlet end of the flexible pipe at a predetermined distance below the level of the water in the tank, and the flow of water is regulated by the pressure or head due to this distance. The water flows into the drinking trough when the resistance due to the height of the water in the trough is less than the pressure due to the head of water above the inlet end of the flexible pipe.

The drinking trough 7 has an opening 12 in one side to permit hogs to drink, and in order to prevent the hogs from fouling the water in the trough, a removable receptacle 14 for water is provided. This receptacle is a rectangular vessel having one or more hooks 15 on its front side which are hooked over the bottom edge of the opening 12. The rear side 16 of the vessel projects above the level of the top of the front side, and an opening 17 is provided at its lower part for the water to enter it. The ends of the receptacle project above the top of its front side, and this projection of the rear side, and the ends hinders the water in the receptacle from fouling the water in the part of the tank intended for cattle. The receptacle 14 is constructed independently of the drinking trough, and can be detached from it, and replaced, at will. A projection 18 is provided at the bottom of the front side of the vessel 14 which engages under a catch or projection 19 on the inside of the trough, so as to prevent the hogs from raising the receptacle by putting their noses under the ends of the hooks.

The hooks are curved, and the receptacle is removed by tilting it pivotally on its hooks and then raising it. The opening 17 is provided with a screen 20 to keep out dirt from the trough, and the receptacle is removed from the trough and is cleaned out as often as necessary.

The cattle tank 8 is supplied with water by an overflow pipe 21 which projects from the supply tank. It is also supplied with water by means of one or more pipes 22 and 24, each of which has a vertical branch 25 which projects upwardly within the supply tank to a predetermined height. The pipe 22 delivers through the sides of the two tanks, and the pipe 24 is connected to their bottoms and has an additional bend, but otherwise the two pipes are alike, and both or either of them can be used.

These pipes can be closed by plugs 26 or other approved means when not required in use. They are provided so that the water can be let into the cattle tank when desired, without entirely emptying the closed supply tank, as the water is only let out of it down to the level of the tops of the vertical branches 25. This arrangement is found advantageous in supplying cattle and hogs with water.

The water in the drinking trough is warmed by a warming pipe 30 arranged in the tank and having its ends connected to the drinking trough at different levels, and preferably near its ends. The water in the pipe 30 is warmed by the water in the tank, and the water in the pipe is thereby caused to circulate in the direction of the arrows, so that the water in the drinking trough is also circulated and is hindered from freezing. The pipe 30 only operates to warm the water in the drinking trough in winter, and when the temperature of the water in the supply tank is higher than that of the water in the drinking trough. The water as it comes from the pump is much warmer than that in the drinking trough, which is exposed to the air below freezing point. The water in the tank is conserved at a higher temperature than the water in the drinking trough because the water in the tank is not exposed to the air and may be protected from the cold in any other approved way, and because there is a considerable body of it in the tank.

What I claim is:

1. A drinking trough for cattle having a drinking opening for hogs on one side, a detachable receptacle for the water for the hogs having an inlet opening for water at its lower part, hooks on the front edge of the receptacle which hook onto the adjacent side of the rough and suspend the said receptacle in the trough, and overlapping projections on the adjacent sides of the said trough and receptacle which prevent the receptacle from being displaced by the hogs.

2. A closed supply tank for water adapted to receive and retain water at a temperature above that of the atmosphere, a drinking trough open at the top and provided with a water supply pipe communicating with the said tank, means for automatically regulating the flow of water through the said pipe, and a circulating pipe arranged inside the supply tank and having the water in it warmed by the water in the tank and having its inlet and outlet ends secured in communication with the drinking trough at different levels.

In testimony whereof I have affixed my signature.

REUBEN G. PETERSON.